United States Patent [19]

Tick

[11] Patent Number: 4,537,864

[45] Date of Patent: Aug. 27, 1985

[54] METAL FLUORIDE GLASSES IN THE $CdF_2$-$PbF_2$-$AlF_3$-(LiF) SYSTEM

[75] Inventor: Paul A. Tick, Corning, N.Y.

[73] Assignee: Corning Glass Works, Corning, N.Y.

[21] Appl. No.: 528,256

[22] Filed: Aug. 31, 1983

[51] Int. Cl.³ ............................................. C03C 3/18
[52] U.S. Cl. ..................................... 501/30; 65/3.12; 501/37; 501/40; 501/904
[58] Field of Search ................... 501/904, 40, 44, 37, 501/38, 30, 152, 151, 22, 43; 65/3.12

[56] References Cited

U.S. PATENT DOCUMENTS

| | | | |
|---|---|---|---|
| 2,466,509 | 4/1949 | Sun | 501/40 |
| 4,141,741 | 2/1979 | Lucas et al. | 501/40 |
| 4,244,722 | 1/1981 | Tsuya et al. | 65/32 |
| 4,308,066 | 12/1981 | Mitachi et al. | 501/40 |
| 4,328,318 | 5/1982 | Miranday et al. | 501/40 |
| 4,378,987 | 4/1983 | Miller et al. | 65/3.12 |

FOREIGN PATENT DOCUMENTS

| | | | |
|---|---|---|---|
| 36373 | 9/1981 | European Pat. Off. | 501/40 |
| 2445820 | 9/1980 | France | 501/40 |
| 2521546 | 8/1983 | France . | |
| 57-51146 | 3/1982 | Japan | 501/40 |
| 57-166328 | 10/1982 | Japan | 65/3.12 |
| 57-191240 | 11/1982 | Japan | 65/3.11 |
| 1410203 | 10/1975 | United Kingdom . | |

OTHER PUBLICATIONS

Leidtorp, R. A. "Vitrification and Crystallization Capacity of $BaPO_3F$—$AlF_3(GaF_3)$(Li, Na, K, Zn, Cd, Pb)$F_x$ Glasses" Izv. Akad.Nauk. SSSR, Neorg. Mater. 1972, 8(11), pp. 2053-2054.

Matecki, M. et al., "Verres Aux Halogenures De Cadmium", *Mat. Res. Bull.*, vol. 17, pp. 1275-1281, 1982.

Shibata, S. et al., "New Binary $PbF_2$—$AlF_3$ Glasses", *Mat. Res. Bull.*, vol. 15, pp. 129-137, 1980.

Matecki, M. et al., "Verres Fluores Dans Le Systeme $ZrF_4$—$ThF_4$—$MF_3$ (M=Y, Lu, Sc, Al)", *Mat. Res. Bull.*, vol. 17, 1035-1043, 1982.

*Primary Examiner*—Helen M. McCarthy
*Attorney, Agent, or Firm*—K. van der Sterre

[57] ABSTRACT

Novel halide glass-forming compositions in the $CdF_2$-$AlF_3$-$PbF_2$ and $CdF_2$-$AlF_3$-$PbF_2$-LiF composition fields are disclosed which exhibit unusual glass stability. The constituents of these glasses are potentially vapor transportable, so that very pure glass articles exhibiting excellent infrared transparency can be envisioned.

7 Claims, 4 Drawing Figures

METAL FLUORIDE GLASSES IN THE CDF$_2$-PBF$_2$-ALF$_3$-(LIF) SYSTEM

The Government has rights in this invention pursuant to Contract No. F49620-83-C-0090 awarded by the Department of the Air Force.

BACKGROUND OF THE INVENTION

1. Field of the Invention

The invention is in the field of glass manufacture, and particularly relates to the manufacture of non-oxide glasses of a type described as halide glasses. Specifically, the invention relates to novel metal fluoride glass compositions which are of interest for glass products such as infrared-transparent optical devices, e.g. glass optical waveguides.

2. Description of the Prior Art

Among the best known of the halide glass-forming systems are the compositions based on BeF$_2$. However, these compositions share the shortcomings of most other halide glasses in that they exhibit relatively short working ranges and are prone to devitrification. In addition, BeF$_2$ is both hygroscopic and highly toxic.

A number of other fluoride glass compositions have been recently discovered. U.S. Pat. No. 4,141,741 discloses a family of ZrF$_4$-based glass-forming compositions in the ZrF$_4$-BaF$_2$-ThF$_4$ composition system which exhibit infrared transparency out to about 7 microns and which are non-hygroscopic. U.S. Pat. No. 4,308,066 discloses a family of fluoride compositions based on ZrF$_4$ and/or AlF$_3$, containing 20–80 mole percent of CaF$_2$, SrF$_2$, BaF$_2$ and/or PbF$_2$, which will form glasses if rapidly quenched.

M. Matecki et al. describe, in *Mat. Res. Bull.*, 17, 1035–1043 (1982), a series of ThF$_4$-ZrF$_4$ compositions containing fluorides selected from the group LaF$_3$, YF$_3$, CdF$_3$, LuF$_3$, ScF$_3$ as glass modifiers. These compositions provide relatively stable glasses, exhibiting glass transition temperatures in the 460°–515° C. range, which can be formed by casting and are infrared-transparent out to about 7 microns.

Glasses based on fluorides other than ZrF$_4$ are also known. S. Shibata et al. disclose, in *Mat. Res. Bull.*, 15, 129–137 (1980), a family of PbF$_2$-based glasses in the PbF$_2$-AlF$_3$ system which will form glasses if rapidly quenched. M. Matecki et al., *Mat. Res. Bull.*, 17, 1275–1281 (1982) report glasses based on CdF$_2$, including binary CdF$_2$-BaF$_2$ and ternary CdF$_2$-BaF$_2$-ZnF$_2$ compositions optionally containing AlF$_3$, YbF$_3$, ThF$_4$ and/or alkali metal fluorides. These compositions will also form thin, infrared transmitting glass elements if rapidly quenched.

SUMMARY OF THE INVENTION

The present invention provides novel fluoride glass compositions in the CdF$_2$-AlF$_3$-PbF$_2$ composition system, desirably containing LiF, which form stable glasses without rapid quenching. The glasses exhibit the infrared transparency characteristic of halide glasses, and in addition are potentially manufacturable by chemical vapor deposition techniques.

Glass-forming compositions in the CdF$_2$-AlF$_3$-PbF$_2$ ternary include those comprising, in mole percent, about 20–46% CdF$_2$, 22–52% AlF$_3$ and 18–44% PbF$_2$. These components should constitute at least about 80 mole percent of the glass, and the mole ratio of CdF$_2$:PbF$_2$ in the composition should be greater than about 1:2.

A desirable optional constituent of the glass is LiF, which may be present in amounts up to about 20 mole percent, and which has a stabilizing effect on the glass when present in the 5–15 mole percent range. Other additives which may be present are YbF$_3$, CaF$_2$, SrF$_2$, BaF$_2$, NaF, and KF, in amounts totaling up to about 10 mole percent, and ZnF$_2$ in an amount up to about 5 mole percent.

BRIEF DESCRIPTION OF THE DRAWING

The invention may be further understood by reference to the drawing, wherein.

DETAILED DESCRIPTION

An important area of possible application for infrared transmitting halide glasses is in the manufacture of second generation, ultra-low-loss optical waveguides. However, while very low losses are theoretically possible with these glasses, there are many real obstacles to the fabrication of efficient devices. The most serious of these are the relatively poor stability of halide glasses and their rather short working ranges. The specific problem which the present invention helps to solve is to provide new, more stable glass compositions.

A very desirable characteristic of a candidate glass would be a composition compatible with a chemical vapor deposition process. The most stable of the known heavy metal fluoride glasses rely heavily on Zr or Hf as the glass formers and Ba as a modifier. While Zr and Hf are in principle vapor transportable, most compounds of these metals have low vapor pressure, thus limiting their attractiveness as a major glass component. Further, no high vapor pressure compound of Ba has yet been developed.

The components which comprise the compositions of the present invention are at least potentially vapor transportable. The main metallic components Pb, Al, Cd, and Li are believed to be transportable as organometallic compounds and, of the additional components that might be added to the system, Yb may also be vapor transportable.

Figure 1:
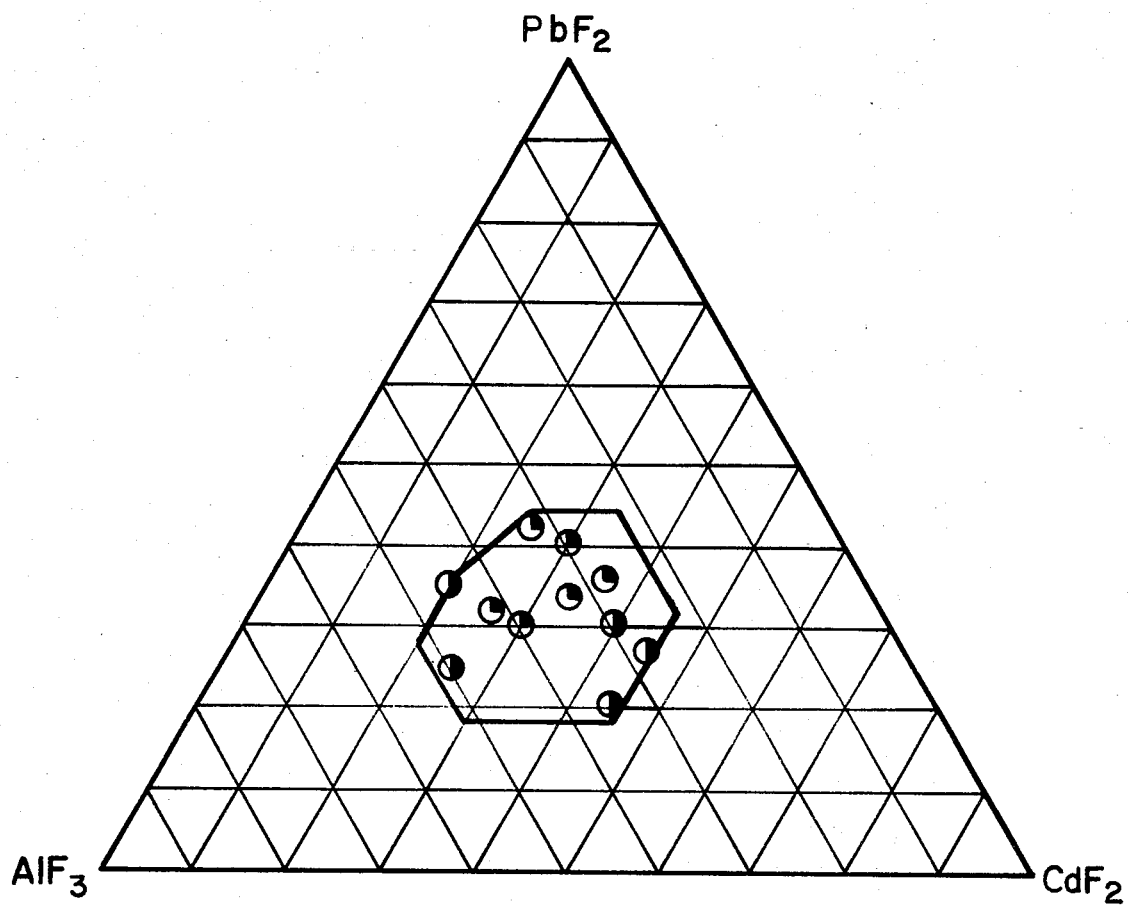
FIG. 1 is a ternary diagram of a glass-forming region of the CdF$_2$-AlF$_3$-PbF$_2$ composition system.

The newly discovered glass-forming region of the CdF$_2$-AlF$_3$-PbF$_2$ composition system is illustrated in FIG. 1 of the drawing, which is a ternary diagram plotting representative compositions in that base system. In the drawings, the quality of glass articles made from each of the compositions shown is reflected in the circles representing the compositions; unshaded circles represent esssentially crystal-free patties when formed by casting to a thickness of several millimeters on stainless steel plates, while quarter-shaded circles represent patties showing some crystallization or phase separation and half-shaded circles represent patties with significant areas of both glassy and non-glass areas, when cast under the same forming conditions. The latter compositions will readily form all-glass samples if rapidly quenched.

A desirable optional constituent of the glasses of the invention is LiF, which appears to stabilize the composition and to increase the composition region over which crystal free glasses can easily be formed by conventional casting techniques. LiF can be present in the composition in amounts up to about 20 mole percent, but compositions wherein the LiF content is about 5-15 mole percent are preferred.

Figure 2:
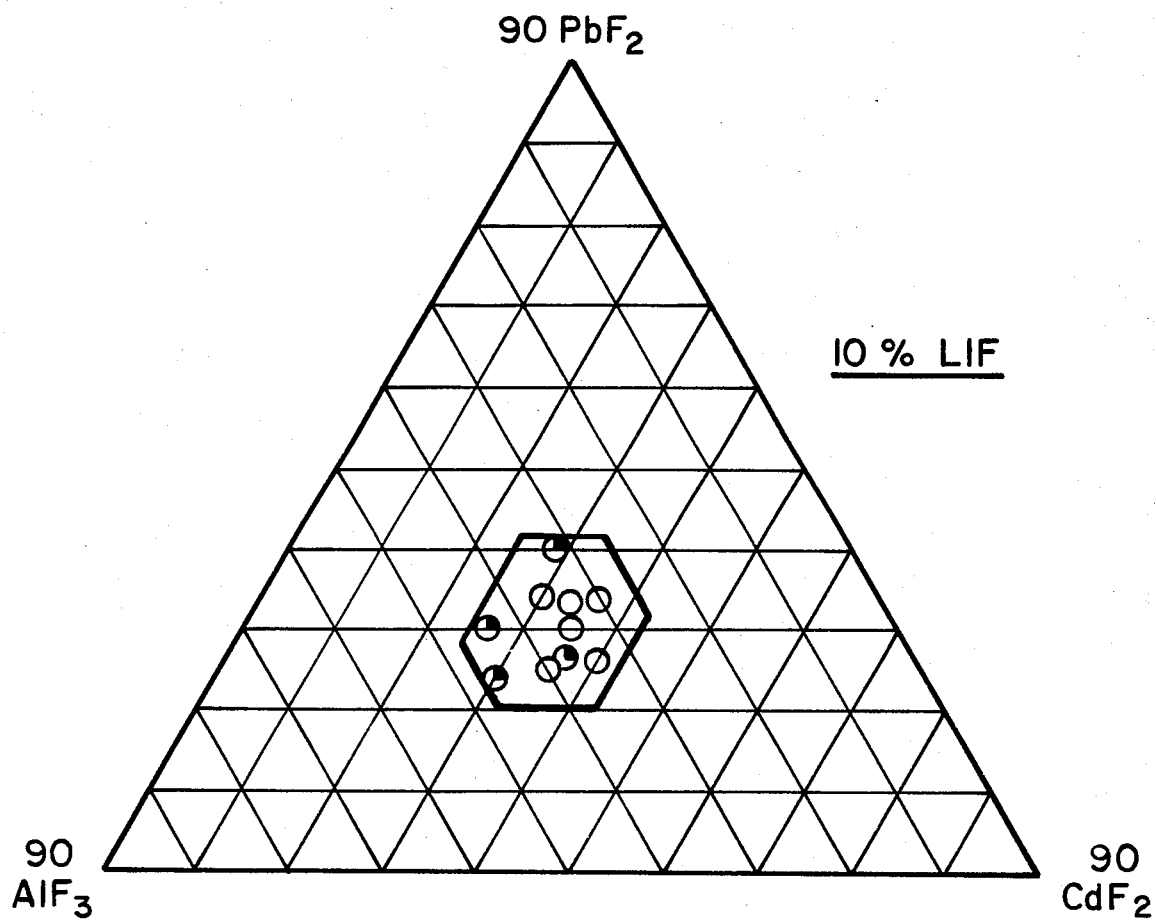
FIG. 2 shows a glass-forming region in the CdF$_2$-AlF$_3$-PbF$_2$-LiF composition system.

FIG. 2 of the drawing illustrates representative glass-forming compositions in the $CdF_2$-$AlF_3$-$PbF_2$-LiF composition system at an LiF concentration of 10 mole percent. The ternary diagram shows the levels of $CdF_2$, $AlF_3$, and $PbF_2$ in those compositions over the ranges 0-90 mole percent.

The quality of glass samples formed from these quaternary compositions is shown by the clear and partially shaded circles of the figure in the same manner as shown in FIG. 1, and represent the quality obtained by the same forming method, i,e., casting onto steel plate. The substantially larger area over which crystal-free or only slightly phase-separated or crystallized samples are obtained is evident.

Among the LiF-containing glasses, the preferred glass-forming compositions are those wherein the LiF content is 5-15 mole percent, the $CdF_2$ content is 21-38 mole percent, the $AlF_3$ content is 23-42 mole percent, and the $PbF_2$ content is 18-37 mole percent. Optional constituents consisting of other fluorides as hereinabove set forth may be present, but the most stable glasses from the standpoint of stability are those consisting essentially of LiF, $CdF_2$, $AlF_3$ and $PbF_2$.

Figure 3:
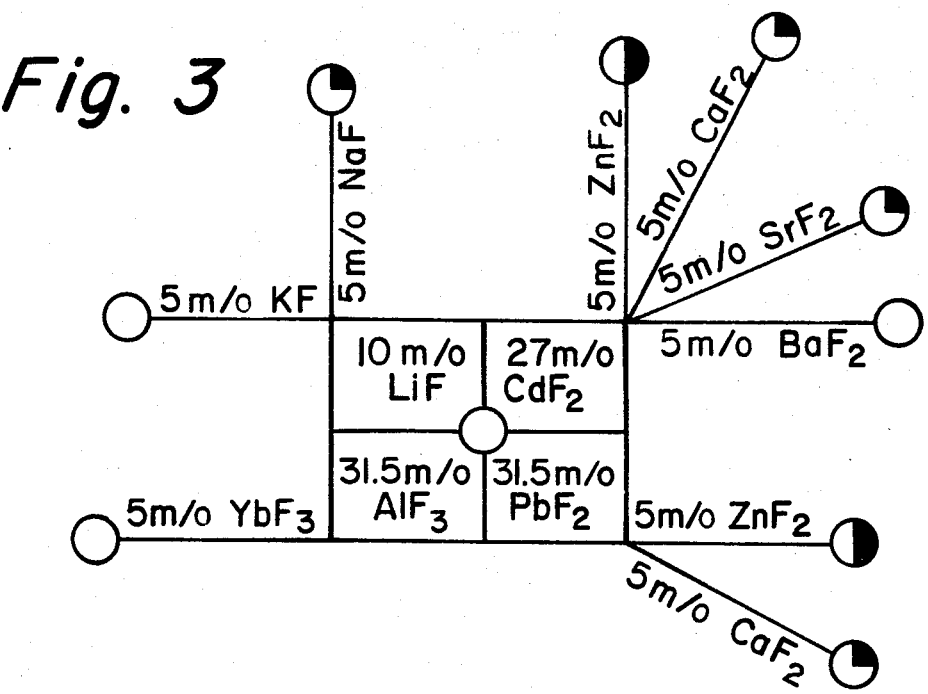
FIG. 3 shows the effects of selected fluoride additives to a selected CdF$_2$-Alf$_3$-PbF$_2$-LiF glass.

The effects of adding selected optional constituents to a stable quaternary glass such as above described are illustrated in FIG. 3 of the drawing. As in FIGS. 1 and 2 above, FIG. 3 schematically illustrates, by means of the clear and partially shaded circles indicative of glass appearance, the quality of cast glass samples containing optional added metal fluorides in partial replacement for the base glass constituents LiF, $CdF_2$, $AlF_3$ and $PbF_2$.

The base glass to which the optional constituents were added, illustrated by the central rectangle in the figure which contains a clear circle representing a crystal-free glass casting, consisted of 10 mole percent LiF, 27 mole percent $CdF_2$, 31.5 mole percent $AlF_3$ and 31.5 mole percent $PbF_2$. The glass samples represented by the surrounding circles had compositions corresponding to that of the base glass, except that the indicated optional constituent replaced the indicated base glass constituent by substitution therefor in the concentration shown on the interconnecting line.

As is evident from FIG. 3, only KF in partial substitution for LiF, BaF in partial substitution for $CdF_2$, and $YbF_3$ in partial substitution for $AlF_3$ had no destabilizing effect on the base glass. Each of NaF, $ZnF_2$, $CaF_2$, and SrF produced a glass which was somewhat less stable than the particular base glass composition employed.

Some additives to these compositions were found to have very strong destabilizing effects at the 5 mole percent substitution level, including $ZrF_4$, $MgF_2$, $CrF_3$, $InF_3$ and $GaF_3$. Thus, although, small amounts of these additives could be used where rapid-quench forming techniques are to be employed, glasses essentially free of these fluorides will be preferred for use in conventional forming processes.

Examples of glass compositions which may be provided in accordance with the invention are reported in Table I below. Included in the Table are batch weights, in grams, for the fluoride constituents used to compound the glass batches, and the compositions of the resulting glasses, in mole percent. Also included for each of the compositions is a glass quality evaluation for a glass patty formed by casting the composition after melting onto steel plate. The quality indicators are as follows: (1) essentially all glass with no evidence of phase separation or devitrification; (2) mostly glass but with some observable phase separation or devitrification; (3) substantial regions of both glassy and non-glass areas.

TABLE I

| Comp. No. | Batch Weight (g) | | | | Composition (Mole %) | | | | Glass Qual. |
|---|---|---|---|---|---|---|---|---|---|
| | $CdF_2$ | $PbF_2$ | $AlF_3$ | LiF | $CdF_2$ | $PbF_2$ | $AlF_3$ | LiF | |
| 1 | 5.0 | 10.3 | 2.1 | 0 | 33 | 42 | 25 | 0 | 2 |
| 2 | 6.3 | 8.1 | 2.1 | 0 | 42 | 33 | 25 | 0 | 2 |
| 3 | 2.5 | 4.0 | 1.4 | 0 | 33 | 33 | 33 | 0 | 2 |
| 4 | 4.3 | 9.3 | 2.4 | .13 | 28.5 | 38.0 | 28.5 | 5 | 1 |
| 5 | 4.3 | 8.2 | 2.8 | .13 | 28.5 | 33.3 | 33.3 | 5 | 1 |
| 6 | 3.7 | 7.9 | 3.2 | .13 | 24.7 | 32.3 | 38.0 | 5 | 2 |
| 7 | 4.1 | 7.7 | 2.6 | .26 | 27.0 | 31.5 | 31.5 | 10 | 1 |
| 8 | 3.5 | 7.5 | 3.0 | .26 | 23.4 | 30.6 | 36.0 | 10 | 1 |
| 9 | 4.1 | 9.7 | 2.0 | .26 | 27.0 | 39.6 | 23.4 | 10 | 2 |
| 10 | 4.3 | 7.5 | 2.1 | .39 | 28.9 | 30.6 | 25.5 | 15 | 1 |
| 11 | 4.1 | 7.4 | 1.9 | .52 | 27.2 | 30.4 | 22.4 | 20 | 3 |

Glass preparation for glasses such as reported in Table I is suitably carried out in an atmospherically controlled melting facility, essentially consisting of a double dry box, one half of which is used to prepare batch, while the other half is used for melting. The glass samples may be melted under nitrogen, which is desirably maintained at less than 10 ppm $O_2$ and less than 1 ppm $H_2O$. Hygroscopic or air reactive fluorides such as $AlF_3$ or $CdF_2$ can be placed in the dry box unopened, then never removed. More stable fluorides can be exposed to the atmosphere before use.

To prepare glass articles having the compositions reported in Table I, the glass batches were prepared in the dry box, hand tumbled, placed in 30 ml platinum crucibles, then plunged into a vertical tube furnace idling at 1100° C. Ten minutes was sufficient to obtain a clear, bubble free melt. The molten glass was then cast onto a stainless steel plate and cooled, after which it was removed for characterization.

The stability of glasses such as shown in Table I can be more accurately characterized by use of a differential scanning calorimeter (DSC). Small chips of representative glasses are ground in a mortar and pestle and placed in the calorimeter where the glass is then heated at a heating rate of 20° C./minute. The calorimeter also contains a sample of alumina as a reference.

Figure 4:
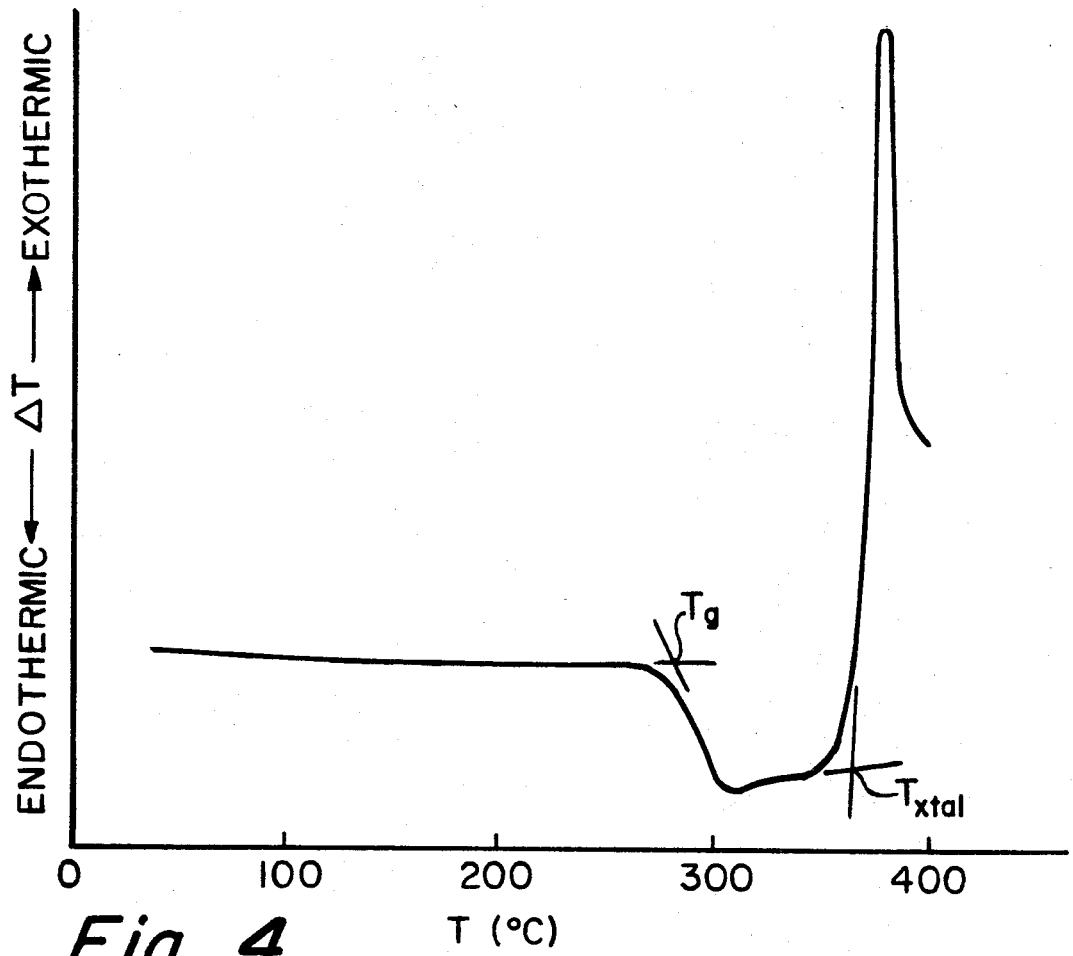
FIG. 4 is a calorimetry plot showing the temperatures of glass transition and crystallization for a stable fluoride composition of the invention.

A DSC curve typical of the more stable glasses of the invention, generated during the heating of a glass consisting of 22.5% $CdF_2$, 31.5% $AlF_3$, 36% $PbF_2$ and 10% LiF is shown in FIG. 4 of the drawing. The glass transition temperature, $T_g$, is obtained from the first endothermic inflection, while the crystallization temperature $T_{xtal}$ is at the first sharp exothermic peak in the curve. The greater the difference between $T_g$ and $T_{xtal}$ the more stable the glass tends to be.

Normally, glass can be made even when the difference $T_{xtal} - T_g$ is quite small, but a difference on the order of 75° C. indicates sufficient stability for forming techniques such as casting. Glass transition temperatures of 270°-300° C. are typical of glasses of the invention, and $T_{xtal}-T_g$ values in the range of 40°–120° C. have been measured on these glasses.

Chemical analyses of glasses such as reported in Table I indicate good retention of the batch constituents under the melting conditions employed, although some oxygen as an impurity, typically in the range of about 1–2% by weight, was found to be present. The source of this oxygen is believed to have been the batch constituents used. If it were removed, e.g. by reactive atmosphere processing or other such known technique, the glasses would be expected to exhibit still better stability.

Refractive index values for these glasses can be determined using the Becke-line technique and, as measured at the sodium D wavelength (5493 Å), is typically in the range of about 1.61–1.65. Infrared transmittance data through as-poured surfaces of samples of these glasses, having thicknesses of 2.5–5.1 mm, suggest an infrared cutoff wavelength of about 7.9–8.2 microns.

In summary, the invention provides a novel family of $CdF_2$-$AlF_3$-$PbF_2$ glasses, including particularly stable $LiF$-$CdF_2$-$AlF_3$-$PbF_2$ glasses, which are at least potentially vapor transportable and offer good infrared transparency. The high stability of these glasses and their potential availability in pure, vapor-deposited form make them promising candidates for use in the fabrication of ultra-low-loss glass optical waveguides and other infrared-transmitting optical devices.

I claim:

1. A non-oxide, metal-fluoride-containing glass-forming composition comprising, in mole percent, about 20–46% $CdF_2$, 22–52% $AlF_3$, 18–44% $PbF_2$, and at least 80% total of $CdF_2+AlF_3+PbF_2$, the mole ratio of $CdF_2$:$PbF_2$ in the composition being greater than 1:2.

2. A glass-forming composition in accordance with claim 1 which consists essentially, in mole percent, of about 20–46% $CdF_2$, 22–52% $AlF_3$, 18–44% $PbF_2$, at least 80% total of $CdF_2+AlF_3+PbF_2$, and 5–15% LiF, and, optionally, up to 10% total of fluorides selected from the group consisting of $YbF_3$, $CaF_2$, $SrF_2$, $BaF_2$, NaF and KF, and up to 5% of $ZnF_2$, the mole ratio of $(CdF_2+ZnF_2+CaF_2+SrF_2+BaF_2)$:$PbF_2$ in the composition being greater than 1:2.

3. A composition in accordance with claim 2 which contains, in mole percent, about 21–38% $CdF_2$, 23–42% $AlF_3$, 18–37% $PbF_2$, and 5–15% LiF.

4. A composition in accordance with claim 3 which consists essentially of $CdF_2$, $AlF_3$, $PbF_2$ and LiF.

5. A non-oxide, metal-fluoride glass article produced from a glass having a crystallization temperature $T_{xtal}$ at least 75° C. higher than its transition temperature $T_g$ and a composition which consists essentially, in mole percent, of about 20–46% $CdF_2$, 22–52% $AlF_3$, 18–44% $PbF_2$, at least 80% total of $CdF_2+AlF_3+PbF_2$, and 5–15% LiF, and, optionally, up to 10% total of fluorides selected from the group consisting of $YbF_3$, $CaF_2$, $SrF_2$, $BaF_2$, NaF and KF, and up to 5% of $ZnF_2$, the mole ratio of $(CdF_2+ZnF_2+CaF_2+SrF_2+BaF_2)$:$PbF_2$ in the composition being greater than 1:2.

6. A glass article in accordance with claim 5 having a composition which contains, in mole percent, about 21–38% $CdF_2$, 24–42% $AlF_3$, 20–37% $PbF_2$, and 5–15% LiF.

7. A glass article in accordance with claim 6 which consists essentially of $CdF_2$, $AlF_3$, $PbF_2$ and LiF.

* * * * *